(12) United States Patent
Simpson et al.

(10) Patent No.: US 8,627,285 B2
(45) Date of Patent: Jan. 7, 2014

(54) TECHNIQUES FOR INSTANTIATING AND CONFIGURING PROJECTS

(71) Applicants: Michel Shane Simpson, American Fork, UT (US); Volker Gunnar Scheuber-Heinz, Pleasant Grove, UT (US); Lee Edward Lowry, Orem, UT (US); Stephen R Carter, Spanish Fork, UT (US)

(72) Inventors: Michel Shane Simpson, American Fork, UT (US); Volker Gunnar Scheuber-Heinz, Pleasant Grove, UT (US); Lee Edward Lowry, Orem, UT (US); Stephen R Carter, Spanish Fork, UT (US)

(73) Assignee: Novell, Inc., Provo, UT (US)

(*) Notice: Subject to any disclaimer, the term of this patent is extended or adjusted under 35 U.S.C. 154(b) by 0 days.

(21) Appl. No.: 13/675,420

(22) Filed: Nov. 13, 2012

(65) Prior Publication Data

US 2013/0073332 A1 Mar. 21, 2013

Related U.S. Application Data

(63) Continuation of application No. 13/108,321, filed on May 16, 2011, now Pat. No. 8,370,792, which is a continuation of application No. 11/831,222, filed on Jul. 31, 2007, now Pat. No. 7,962,889.

(51) Int. Cl.
*G06F 9/44* (2006.01)

(52) U.S. Cl.
USPC .......................................................... 717/121

(58) Field of Classification Search
USPC .................. 717/100–102, 120–121, 123
See application file for complete search history.

(56) References Cited

U.S. PATENT DOCUMENTS

| | | | |
|---|---|---|---|
| 6,138,104 A | 10/2000 | Marchak et al. | |
| 6,351,734 B1 | 2/2002 | Lautzenheiser et al. | |
| 6,766,334 B1 | 7/2004 | Kaler et al. | |
| 6,810,401 B1 | 10/2004 | Thompson et al. | |
| 6,928,447 B2 | 8/2005 | Kaler et al. | |
| 6,973,466 B2 | 12/2005 | Kaler et al. | |
| 7,096,222 B2 | 8/2006 | Kern et al. | |
| 7,650,591 B2 * | 1/2010 | Bau | 717/116 |
| 7,734,491 B2 | 6/2010 | Kayahara et al. | |
| 7,739,137 B2 | 6/2010 | Jagtiani et al. | |
| 7,810,067 B2 | 10/2010 | Kaelicke et al. | |
| 7,870,535 B2 | 1/2011 | Rippert, Jr. et al. | |
| 7,962,889 B2 | 6/2011 | Simpson et al. | |
| 8,171,485 B2 | 5/2012 | Muller et al. | |
| 2002/0184250 A1 | 12/2002 | Kern et al. | |
| 2003/0103089 A1 * | 6/2003 | Ramani et al. | 345/848 |
| 2003/0137886 A1 * | 7/2003 | Pierrat et al. | 365/200 |
| 2003/0187670 A1 | 10/2003 | Hassinger et al. | |
| 2004/0103405 A1 * | 5/2004 | Vargas | 717/137 |
| 2004/0111705 A1 | 6/2004 | Motoyama et al. | |
| 2004/0215646 A1 | 10/2004 | Kaler et al. | |
| 2004/0216089 A1 | 10/2004 | Kaler et al. | |
| 2004/0216090 A1 | 10/2004 | Kaler et al. | |
| 2005/0091291 A1 | 4/2005 | Kaler et al. | |
| 2007/0198785 A1 * | 8/2007 | Kogge et al. | 711/154 |
| 2009/0037921 A1 | 2/2009 | Simpson et al. | |
| 2011/0219353 A1 | 9/2011 | Simpson et al. | |

* cited by examiner

*Primary Examiner* — Anna Deng
(74) *Attorney, Agent, or Firm* — Schwegman Lundberg & Woessner, P.A.

(57) ABSTRACT

Techniques for project management instantiation and configuration are provided. A master project includes policy directives that drive the dynamic instantiation and configuration of resources for a project. The resources are instantiated and configured on demand and when resources are actually requested, in response to the policy directives.

17 Claims, 3 Drawing Sheets

TECHNIQUES FOR INSTANTIATING AND CONFIGURING PROJECTS

RELATED APPLICATIONS

The present application is co-pending with and claims priority to as a continuation of U.S. patent application Ser. No. 13/108,321, filed on May 16, 2011 and entitled: "Techniques for Instantiating and Configuring Projects," and which presently stands allowed; Moreover, U.S. patent application Ser. No. 13/108,321 is a continuation of and claims priority to U.S. patent application Ser. No. 11/831,222, filed on Jul. 31, 2007, and entitled: "Techniques for Instantiating and Configuring Projects," now issued as U.S. Pat. No. 7,962,889, the disclosures of these are incorporated by reference herein in their entireties.

BACKGROUND

Increasingly enterprises and governments are turning to technology to automate and streamline their internal operations and business processes. Furthermore, the advent of the Internet and the World-Wide Web (WWW) has allowed enterprises and governments to delivery goods and services in an automated and nearly instantaneous fashion across the entire globe.

With any good or service provided by an enterprise or a government, there can be potentially a myriad of activities and expenses associated with those activities, which the enterprise or government endures before the good or service is available in the marketplace for consumption.

For example, word processing software has to be initially defined, developed and tested before it can be released for sale. These activities are usually managed internally by high-salaried project managers. For the most part, the project managers are administrators with skill in acquiring other personnel and equipment within an enterprise to make a project move from conception and development to release. In some cases, projects are so large within an enterprise that multiple layers of project managers are needed for any given project.

In large part, the industry has not been able to successfully automate and streamline the project management process. As a result, the cost of goods and services are likely unduly inflated and the time-to-market for goods and services is longer than it probably should be.

One reason for this lack of automation is the perceived complexity associated with project management in general. There are a variety of considerations such as laws, regulations, internal procedures that have to be followed. In addition, there may be limited personnel with specific skill sets some of which may be in high demand and unavailable within the enterprise and some of which the enterprise does not have and will have to contract out or hire in order to obtain.

Moreover, even when a manually implemented project management system is in place within an enterprise, there often arises a variety of complex resource limitations that necessitate ad hoc modifications that cannot truly be automated in any real sense.

For example, a large project may include a plethora of assets and making all these assets available in one environment and at one time to the exclusion of other enterprise assets may prove too costly or draining on the enterprise. So, one or a few skilled employees may regularly and manually move and reconfigure assets on an as needed basis to alleviate the situation and make it workable. Yet, this scenario is ripe for errors and problems, especially when the skilled employees are out of the office or leave the enterprise.

Thus, what is needed is an automated and flexible mechanism, which allows for improved project instantiation and configuration within a project management system.

SUMMARY

In various embodiments, techniques for instantiating and configuring projects are provided. More specifically, and in an embodiment, a method is provided for dynamically instantiating a master project. A project definition is acquired for a project within a first processing environment, which is associated with a first stage of a lifecycle for the project. Next, selective resources of the project that are associated with the first stage are dynamically instantiated and configured on demand and when the resources are requested using the project definition.

DETAILED DESCRIPTION

Figure 1:
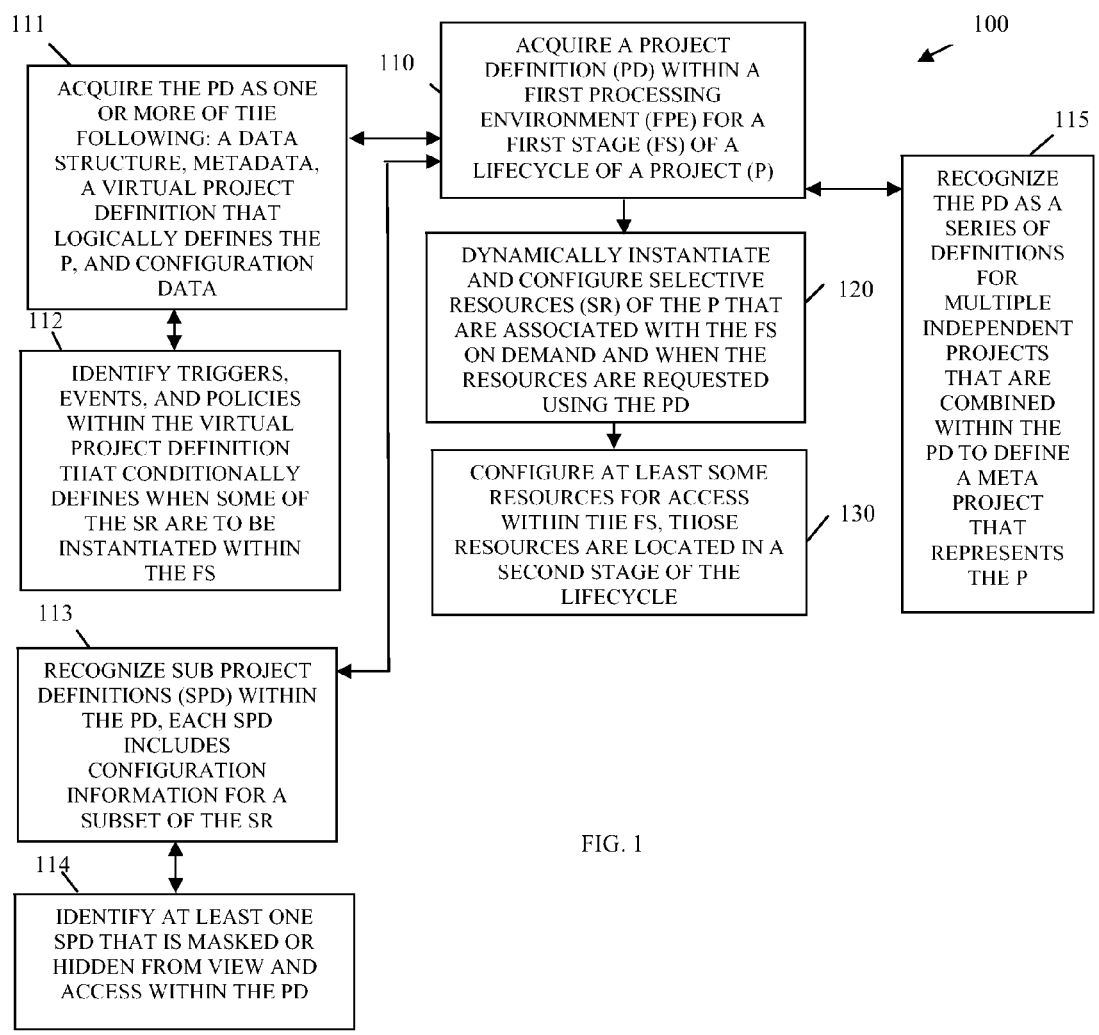
FIG. 1 is a diagram of a method for dynamically instantiating a master project, according to an example embodiment.

A "resource" includes a user, content, a processing device, a node, a service, an application, a system, a schema definition, a directory, an operating system (OS), a file system, a data store, a database, a policy definition, a configuration definition, a file, a World-Wide Web (WWW) service, a WWW page, groups of users, combinations of these things, etc. The terms "service," "application," and "system" may be used interchangeably herein and refer to a type of software resource that includes instructions, which when executed by a machine performs operations that change the state of the machine and that may produce output.

A "principal" is a special type of resource that performs one or more actions against other resources. So a principal may be a user or an automated service.

In an embodiment, each resource is electronically defined and represented as having one or more attributes. Each attribute includes one or more name value pairs. For example, a server resource may include an attribute associated with its physical Internet Protocol (IP) address and that attribute may be represented by the following name value pair: "IP=100.1.1.10." The server resource may also have its own identity (discussed below) and may include other attributes such as whether the IP address is static or dynamic, etc. Attributes may also include references to policy or even specific configuration details for a given processing environment that a resource is to be deployed to.

A "project" refers to the activity associated with an enterprise or government producing a good (product) or personal service (e.g., financial advice, etc.) for consumption in the marketplace. The activity for the project is defined in various stages of the project's lifecycle, such as by way of example only project definition, project development, project testing, project release, etc. Thus, a "project" is represented and electronically defined as a series of stages associated with the project's lifecycle. Each stage includes its own processing environment having its own or shared resources. So, a stage is represented and electronically defined as one or more resources and their relationships with other resources of the same stage or a different stage. A project may also be viewed as a type of resource.

A virtual project is one that includes other sub projects or nested projects. Some resources associated with a virtual project may be instantiated and ready for use while others are configured and instantiated according to policy.

Projects and virtual projects are defined via configuration data, metadata, policy, and other directives or statements that can be interpreted by and acted upon by other services or resources to logically assemble and define a collection of resources as a particular project or meta resource.

A "processing environment" refers to one or more physical processing devices organized within a local network. For example, several computers connected via a local area network (LAN) may collectively be viewed as a processing environment. The processing environment also refers to software configurations of the physical processing devices, such as but not limited to operating system, file system, directory service, etc. A single processing environment may be logically defined, such that it spans multiple different networks (e.g., multiple different LAN's, a LAN and a wide-area network (WAN), etc.).

An "identity service" refers to a special type of service that is designed to manage and supply authentication services and authentication information for resources. So, an identity service may authenticate a given resource for access to a variety of local and external services being managed by that identity service. A single resource may have multiple identity services. In addition the identity service itself may be viewed as a type of resource. In this manner, identity service may authenticate and establish trust with one another viewing one another as specific type of resource.

According to an embodiment, some example identity services are described in "Techniques for Dynamically Establishing and Managing Authentication and Trust Relationships," filed on Jan. 27, 2004, and having the U.S. Ser. No. 10/765,523; "Techniques for Establishing and Managing a Distributed Credential Store," filed on Jan. 29, 2004, and having the U.S. Ser. No. 10/767,884; and "Techniques for Establishing and Managing Trust Relationships," filed on Feb. 3, 2004, and having the U.S. Ser. No. 10/770,677; all of which are commonly assigned to Novell, Inc., of Provo, Utah and the disclosures of which are incorporated by reference herein.

An identity service may also provide single sign-on services to a resource. That is, a resource may sign-on to an identity service and acquire identities and credentials to access a variety of other services or resources. In some cases, the identity service is modified or enhanced to perform some of the teachings presented herein and below.

A resource is recognized via an "identity." An identity is authenticated via various techniques (e.g., challenge and response interaction, cookies, assertions, etc.) that use various identifying information (e.g., identifiers with passwords, biometric data, hardware specific data, digital certificates, digital signatures, etc.). A "true identity" is one that is unique to a resource across any context that the resource may engage in over a network (e.g., Internet, Intranet, etc.). However, each resource may have and manage a variety of identities, where each of these identities may only be unique within a given context (given service interaction, given processing environment, given virtual processing environment, etc.).

The identity may also be a special type of identity that the resource assumes for a given context. For example, the identity may be a "crafted identity" or a "semantic identity." An example for creating and using crafted identities may be found in U.S. patent application Ser. No. 11/225,993; entitled "Crafted Identities;" filed on Sep. 14, 2005; and the disclosure of which is incorporated by reference herein. An example for creating and using semantic identities may be found in U.S. patent application Ser. No. 11/261,970; entitled "Semantic Identities;" filed on Oct. 28, 2005; and the disclosure of which is incorporated by reference herein.

Various embodiments of this invention can be implemented in existing network architectures, security systems, data centers, and/or communication devices. Any particular architectural layout or implementation presented herein is provided for purposes of illustration and comprehension only and is not intended to limit aspects or embodiments of the invention.

It is within this context, that various embodiments of the invention are now presented with reference to the FIGS. 1-4.

FIG. 1 is a diagram of a method 100 for dynamically instantiating a master project, according to an example embodiment. The method 100 (hereinafter "project instantiation service") is implemented as instructions in a machine-accessible and readable medium. The instructions when executed by a machine perform the processing depicted in FIG. 1. The project instantiation service is also operational over and processes within a network. The network may be wired, wireless, or a combination of wired and wireless.

As will be more fully described herein and below, the project instantiation service permits a project to be defined in such a manger that the project instantiation service can dynamically and selectively instantiate, configure, and make resources available on demand, when needed, or when requested.

At 110, the project instantiation service acquires a project definition for a project within a first processing environment. The first processing environment is associated with a first stage of a lifecycle for the project. The use of the adjective "first" is not to be limited to an initial stage or the lifecycle as it can be any stage associated with the lifecycle in this sense it may be viewed as a particular stage of the lifecycle. It is noted that in some cases, the term "first" may also be used to represent the initial stage but it is not limited in all case to the initial stage of the project lifecycle.

In an embodiment, at 111, the project instantiation service acquires the project definition as one or more of the following: a data structure, a table, a database table, metadata, configuration data, and a virtual project definition that logically defines the project.

In still another case, at 112, the project instantiation service identifies triggers, events, and/or policies within the virtual project definition. These items conditionally define when some of the selective resources are to be instantiated and configured within the first stage and the first processing environment. The events may be associated with a first principal acting within the first processing environment, the first processing environment as a whole, or event raised by resources or other projects associated with external and different processing environments.

In yet another situation, at 113, the project instantiation service recognizes sub project definitions within the project definition. Each sub project definition includes configuration information for a subset of the selective resources. The sub project definitions can be included in the project definition via an identifier or reference that the project instantiation service uses to access a configuration repository or policy repository to acquire the full sub project definition. In other cases, the sub project definition is entirely contained as a sub portion of the project definition.

Accordingly, at 114, and in some cases the project instantiation service identifies at least one sub project definition that is masked or hidden from view and access within the project definition. So, an alias reference or identifier or other masked code may appear in the project definition. The project instantiation service uses the reference or code to directly/indirectly (via another service) acquire the sub project definition. This hidden sub project can, according to policy directives, be auto mapped and configured when it is appropriate to do so within the first stage and the first processing environment. Security may prevent a first principal from even knowing that the hidden sub project exists and is operating within the first processing environment. This type of hidden project may be used for a variety of reasons, such as but not limited to an auditing project, a tracking project, etc.

In still another embodiment, at 115, the project instantiation service recognizes the project definition as a series of definitions for multiple independent projects that are combined within the project definition to define a global or meta project that represents the project. In other words, the project can be a collection of smaller independently processing projects that are recognized, assembled, and processed as a single meta project via the project definition and its directives.

Essentially, the project definition includes statements, references to statements, files, references to files, resources, identifiers for resources, and/or policies that the project instantiation service interprets and uses to drive when resources are to be instantiated and configured for the project in the first processing environment.

At 120, the project instantiation service dynamically instantiates and configures selective resources of the project that are associated with the first stage. The dynamic instantiation and configuration occurs on demand and when the resources are requested as defined in the project definition. Instantiation means that the resources are loaded into memory and/or initiated for processing. Any configuration details required for use are also established. It is noted that from the viewpoint of the principal, the resources appear to always be there and available for use.

However, it is only when the resources are actually needed or required by policy to be available that the project instantiation service dynamically instantiates and configures them. In this manner, the first processing environment does not become loaded and memory intensive when certain selective resources are not being used or needed. This makes this dynamic approach more process and memory efficient than conventional approaches and does so in an automated manner.

According to an environment, at 130, the project instantiation service configures at least some resources for access within the first stage when those second resources are located in an entirely different processing environment and different second stage of the project lifecycle. In other words, the project definition can drive the project instantiation service to act or facilitate a proxy arrangement where external resources appear to be and act as if they are present and operating within the first processing environment. This again serves to alleviate the processing and memory loads of the first processing environment and permits mega projects to be handled within a first processing environment that may have limited processor and memory capabilities.

Figure 2:
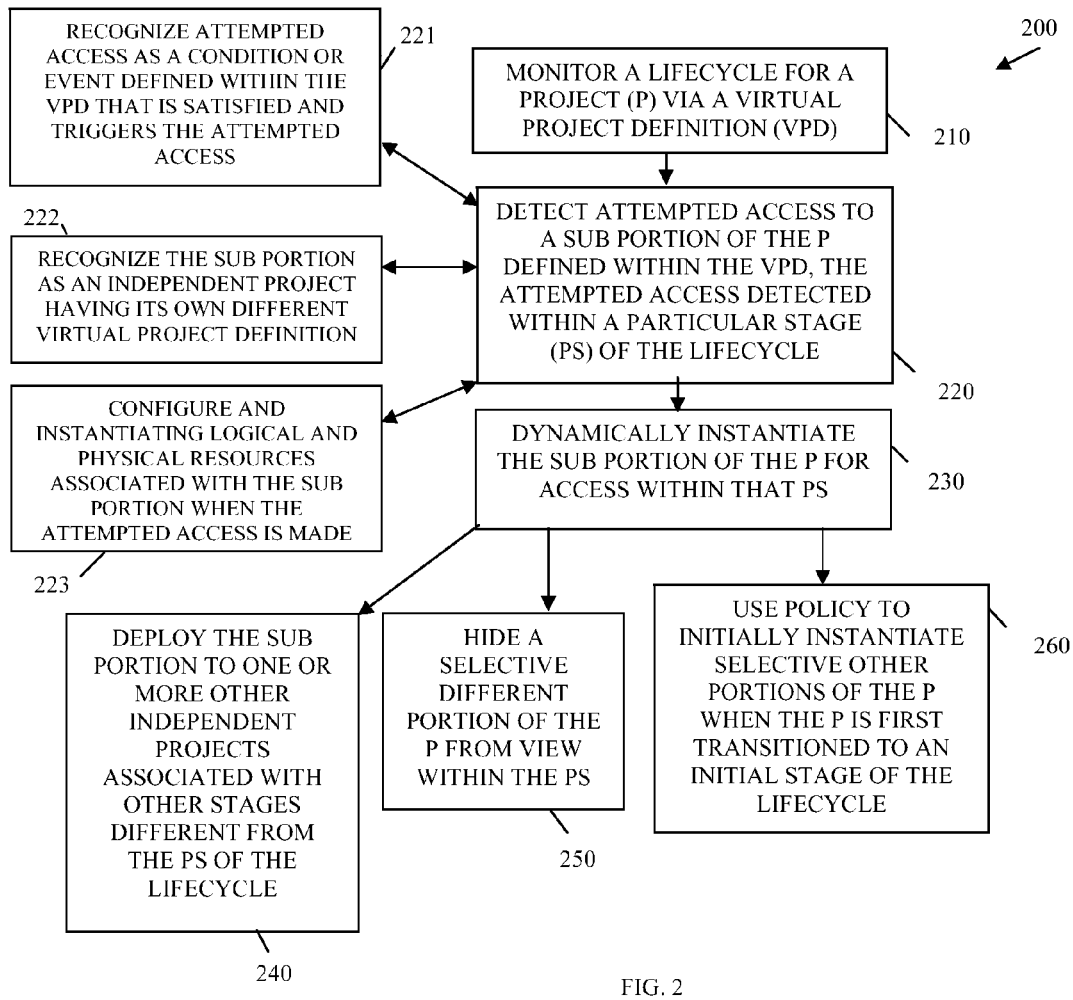
FIG. 2 is a diagram of a method for selectively instantiating portions of a project via a virtual project definition, according to an example embodiment.

FIG. 2 is a diagram of a method 200 for selectively instantiating portions of a project via a virtual project definition, according to an example embodiment. The method 200 (hereinafter "virtual project management service") is implemented as instructions in a machine-accessible and readable medium. The instructions when executed by a machine perform the processing depicted in FIG. 2. The virtual project management service is also operational over and processes within a network. The network may be wired, wireless, or a combination of wired and wireless.

The virtual project management service represents an enhanced perspective of the project instantiation service represented by the method 100 discussed above with the FIG. 1. In other words, the virtual project management service can be viewed as an enhancement version of the project instantiation service.

At 210, the virtual project management service actively monitors a lifecycle for a project via a virtual project definition. The virtual project definition includes a variety of sub portions where each sub portion can be a reference to an entirely independent sub project of the project.

At 220, the virtual project management service detects an attempted access to a sub portion of the project, which is defined in the virtual project definition. The attempted access is detected within a particular stage of the project lifecycle. The attempted access can be detected in a variety of manners.

For instance, at 221, the virtual project management service can detect the attempted access as a condition or event defined within the virtual project definition that when stratified triggers that attempted access notification or detection, which the virtual project management service notices.

In still another case, at 222, the virtual project management service can recognize the sub portion included within the virtual project definition as an entirely self-contained and independent project having its own different virtual project definition. For the viewpoint of the project the self-contained project is a sub project, but from the view of the self-contained project it views itself as a project with no dependency on the project that contains it.

In an embodiment, at 223, the virtual project management service configures and instantiates logical and physical resources associated with the sub portion when the attempted access is made. Thus, resources used and defined within the sub project are just configured and instantiated when the virtual project management service decides it is appropriate to do so, and it is appropriate to do so when policy in or associated with the virtual project definition dictates that it is appropriate to do so.

At 230, the virtual project management service dynamically instantiates the sub portion for immediate access within the particular stage. So, again the sub portion is instantiated and configured on demand for use in the particular stage. This situation is much more efficient than instantiating and configuring the sub portion when it is not needed, since if that were done resources (processor and memory) are wasted and the loaded and unused resources also degrade other resources that are actively needed within the particular stage and its processing environment.

According to an embodiment, at 240, the virtual project management service deploys the sub portion to one or more other independent projects associated with other stages different from the particular stage of the project lifecycle. So, the sub portion may be spawned as an independent project to process in an entirely different stage and processing environment and yet be configured to be accessed and used with the project from the particular stage and particular processing environment.

In another embodiment, at 250, the virtual project management service hides a selective and different portion of the project from view within the particular stage and its particular processing environment. So, as discussed above with reference to the method 100, portions of the project can be entirely secretive and hidden from principals operating on the project within the first stage. These hidden stages can be populated and instantiated based on actions of the principals and unknown to the principals for purposes of such things as auditing, tracking, etc.

In still another case, at 260, the virtual project management service uses policy to initially instantiate selective other portions of the project when the project is first transitioned to an initial stage of the project lifecycle. So, some portions and associated resources can be populated, loaded, and instantiated based on policy when a transition in the project is detected or when the project is initiated in its initial stage of the lifecycle.

Figure 3:
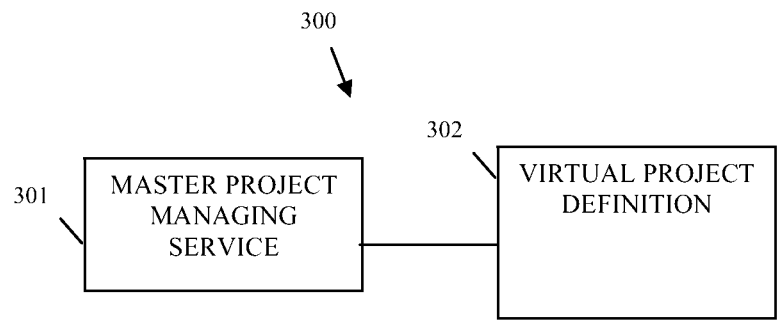
FIG. 3 is a diagram of a project instantiation and configuration system, according to an example embodiment.

FIG. 3 is a diagram of a project instantiation and configuration system 300, according to an example embodiment. The project instantiation and configuration system 300 is implemented as instructions on or within a machine-accessible and readable medium. The instructions when executed by a machine perform various aspects of the processing depicted with respect to the method 100 of the FIG. 1 and the method 200 of the FIG. 2. The project instantiation and configuration system 300 is also operational over a network and the network may be wired, wireless, or a combination of wired and wireless.

The project instantiation and configuration system 300 includes a master project managing service 301 and a virtual project definition 302. Each of these components and their interactions with one another will now be discussed in turn.

The master project managing service 301 is implemented in a machine-accessible and readable medium and is to process on a machine within one or more processing environments of the network. Example processing associated with the master project managing service 301 was described in detail above with reference to the project instantiation service represented by the method 100 of the FIG. 1 and the virtual project management service represented by the method 200 of the FIG. 2.

The master project managing service 301 interprets the virtual project definition 302 and its directives, references, statements, and associated policies for purposes of managing a master project. The master project includes a plurality of stages associated with its project lifecycle. Moreover, each stage is associated with a different processing environment.

In response to the directives and policies included in the virtual project definition 302, the master project managing service 301 initially deploys some resources associated with the virtual project definition 302 when the master project is initiated in an initial stage of the lifecycle. Furthermore, the master project managing service 301 intentionally delays deploying other deferred resources associated with the master project until permitted to deploy those deferred resources in response to the policies.

In an embodiment, the master project managing service 301 recognizes that some of the virtual project definitions 302 include nested virtual project definitions for sub projects that are independent of the master project and tied to the master project via the virtual project definition 302. Further, a few of these nested virtual project definitions are associated with already instantiated and configured resources for some of those sub projects. Thus, the master project managing service 301 can make these particular sub projects immediately available for use within the master project when the policies permit this to be the case.

In another case, the master project managing service 301 assembles the sub projects and their sub project resources for use within a particular stage and provides access to a number of the sub project resources from the particular stage when those sub project resources are located in different stages or the lifecycle. So, the master project managing service 301 can act as a proxy or facilitate a proxy arrangement for sub project resources already available in external or different stages and processing environments and the master project managing service 301 can actually cause the sub project and their resources to be instantiated and available for use within a particular stage.

In yet another case, the master project managing service 301 deploys each of the sub projects in a variety of different stages for the lifecycle in response to the policies of the virtual project definition 302. Moreover, the master project managing service 301, when directed by the policies, re-assembles the sub projects as the master project within a particular or target stage of the lifecycle. The particular stage can also be determined by the policies of the virtual project definition 302 for the master project. So, the sub projects can be initiated in a variety of processing environments and stages of their lifecycles and the master project can define for the master project managing service 301 via the policies when they should be logically re-assembled and associated for use within a particular stage of the master project.

The virtual project definition 302 is implemented in a machine-accessible and readable medium and is interpreted by the master project managing service 301.

Again, the virtual project definition 302 is interpreted by the master project managing service 301 and includes directives and policies that drive the processing of the master project managing service 301 to determine when and if sub projects and resources are to be configured and instantiated for use with the master project.

In an embodiment, the virtual project definition 302 includes nested virtual project definitions for sub projects that are entirely independent of the master project, as was discussed above. In some cases, at lease one of these nested virtual project definitions is hidden from a user or principal's view with a masked code, reference, or alias identifier within the virtual project definition 302. When deployed sub project resources used in the hidden sub project are not accessible or viewable to the user or principal.

Figure 4:
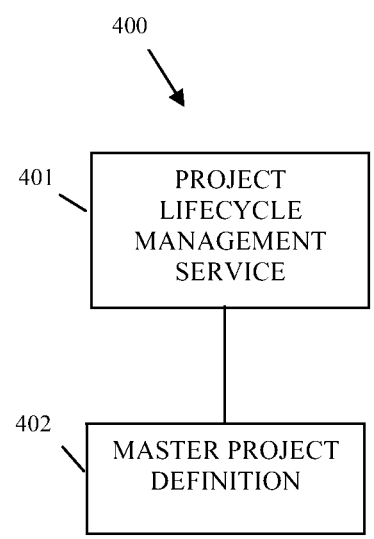
FIG. 4 is a diagram of another project instantiation and configuration system, according to an example embodiment.

FIG. 4 is a diagram of another project instantiation and configuration system 400, according to an example embodiment. The project instantiation and configuration system 400 is implemented as instructions on or within a machine-accessible and readable medium. The instructions when executed by a machine perform various aspects of the processing depicted with respect to the methods 100 and 200 of the FIGS. 1 and 2, respectively, and processing associated with the system 300 of the FIG. 3. The project instantiation and configuration system 400 is also operational over a network and the network may be wired, wireless, or a combination of wired and wireless. Furthermore, the project instantiation and configuration system 400 presents an alternative perspective to the project instantiation and configuration system 300 represented by the FIG. 3.

The project instantiation and configuration system 400 includes a project lifecycle management service 401 and a master project definition 402. Each of these components and their interactions with one another will now be discussed in turn.

The project lifecycle management service 401 is implemented in a machine-accessible and readable medium and is to process on a machine within a first processing environment of the network. Example processing of the project lifecycle management service 401 was described in detail above with reference to the methods 100 and 200 and the system 300 of the FIGS. 1-3, respectively.

The project lifecycle management service 401 monitors activities of a first principal within a first processing environment with respect to the master project definition 402 to determine when some or each of the independent sub projects are to be configured and made available to the first principal in the first processing environment.

So, the project lifecycle management service 401 tracks events, actions, and activities and uses directives and policy defined in the master project definition 402 to determine when some or all of the sub projects defined in the master project definition 402 are to be instantiated and configured for use within the first processing environment for use and access by the first principal. Again, some of these sub projects may be hidden and not accessible to the first principal via the directives and the policies.

In an embodiment, the project lifecycle management service 401 also monitors other events associated with the independent sub projects. Some of the vents are communicated and occur in other external processing environments occurring over a wide-area network (WAN), such as the Internet or World-Wide Web (WWW).

The master project definition 402 is implemented in a machine-accessible and readable medium and is to be interpreted by the project lifecycle management service 401.

The master project definition 402 includes nested project definitions or references to independent sub projects. Furthermore, the master project definition 402 also defines, via the nested project definitions, a single master project. The single master project having multiple stages in a lifecycle of that master project.

According to an embodiment, at least one nested project definition is associated with a particular sub project that is unavailable and not viewable by the first principal.

In another situation, the particular sub project has resources that automap, configure, and instantiate to the first processing environment according to policy defined in the master project definition.

In yet another case, the sub projects appear to the first principal to be present and available for access within the first processing environment even when some of the sub projects are not yet configured and actually available for use within the first processing environment. So, the first principal believes all resources and sub projects are there in the first processing environment, when in fact some are not and are only instantiated and configured when needed or when access is attempted.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method implemented and residing in a non-transitory machine-readable medium for execution on a machine, comprising:
    acquiring, by the machine, a project definition for a project within a first stage of a lifecycle, each stage of the lifecycle handled by a different processing environment;
    recognizing a sub project definition within the project definition that is hidden from view and from access within the project definition;
    identifying a masked code within the project definition for the sub project definition;
    using the masked code to acquire the sub project definition; and
    dynamically instantiating and configuring, by the machine, first stage resources of the project that are associated with the first stage when requested within the first stage based on the project definition and the sub project definition.

2. The method of claim 1, wherein acquiring further includes acquiring the project definition as configuration data.

3. The method of claim 1, wherein acquiring further includes evaluating policies to define a timing for when some of the first stage resources are to be instantiated within the first stage.

4. The method of claim 3, wherein evaluating further includes associating the policies with one or more of: a first principal acting with a first processing environment for the first stage, the first processing environment as a whole, and events raised by resources or other projects associated with external and different processing environments.

5. The method of claim 1, wherein using further includes enforcing security to prevent a first principal from even knowing that the hidden sub project exists and is operating within the first processing environment.

6. The method of claim 5, wherein enforcing further includes using the hidden sub project to audit and track the project.

7. The method of claim 1, wherein dynamically instantiating further includes making the first stage resources appear to be ready for use to a principal when each first stage resource is in fact loaded and initiated for processing when accessed by the principal for use within the first stage.

8. A method implemented and residing in a non-transitory machine-readable medium for execution on a machine, comprising:
    detecting, by the machine, an access attempt made to a sub portion of the project, the project including multiple stages and each stage associated with a particular processing environment that is different from the processing environments of remaining stages;
    acquiring a project definition for the project;
    recognizing definition of the sub portion of the project within the project definition that is hidden from view and from access within the project definition;
    identifying a masked code within the project definition for the definition of sub portion of the project;
    using the masked code to acquire the definition of the sub portion of the project; and
    dynamically instantiating, by the machine, resources used in the sub portion of the project for access within the particular processing environment and for a particular stage of the project based on the definition of the sub portion of the project.

9. The method of claim 8, wherein detecting further includes recognizing an event that satisfies a condition to trigger the access attempt.

10. The method of claim 8, wherein detecting further includes acquiring a project definition for the project that includes an indication as to when the access attempt is to be detected.

11. The method of claim 10, wherein acquiring further includes acquiring configuration data from the project definition for the sub portion of the project.

12. The method of claim 8, wherein dynamically instantiating further includes configuring and instantiating the resources as both logical and physical resources needed by the sub portion of the project when access is made.

13. The method of claim 8 further comprising, simultaneously deploying, by the machine, the sub portion of the project to one or more other independent projects based on configuration data for the sub portion.

14. The method of claim 8 further comprising, hiding, by the machine, a selective different sub portion of the project from view within the particular stage.

15. A method implemented and residing in a non-transitory machine-readable medium for execution on a machine, comprising:
- interpreting, by the machine, a project definition to manage a project having a plurality of stages associated with a lifecycle of the project, each stage associated with a different processing environment;
- recognizing a sub project definition within the project definition that is hidden from view and from access within the project definition;
- identifying a masked code within the project definition for the sub project definition;
- using the masked code to acquire the sub project definition; and
- deploying on demand, by the machine, resources of the project based on information defined in the project definition and the sub project definition.

16. The method of claim 15 further comprising, deferring, by the machine, deployment of some resources until dictated by a policy.

17. The method of claim 15 further comprising, hiding, by the machine, nested sub project definitions of the project definition from view when sub projects associated with the nested sub project definitions are not accessible to a user.

* * * * *